US008012026B2

(12) United States Patent
Dreyer et al.

(10) Patent No.: US 8,012,026 B2

(45) Date of Patent: Sep. 6, 2011

(54) GAMING MACHINE AND A METHOD OF SUPPLYING A FLEXIBLE ARCHITECTURE GAMING MACHINE

(75) Inventors: Peter Dreyer, Lane Cove (AU); Neil Hogg, Lane Cove (AU)

(73) Assignee: Aristocrat Technologies Australia Pty. (AU)

( * ) Notice: Subject to any disclaimer, the term of this patent is extended or adjusted under 35 U.S.C. 154(b) by 998 days.

(21) Appl. No.: 11/573,125

(22) PCT Filed: Aug. 4, 2005

(86) PCT No.: PCT/AU2005/001166

§ 371 (c)(1),
(2), (4) Date: Jul. 12, 2007

(87) PCT Pub. No.: WO2006/012698

PCT Pub. Date: Feb. 9, 2006

(65) Prior Publication Data

US 2008/0254880 A1 Oct. 16, 2008

(30) Foreign Application Priority Data

Aug. 4, 2004 (AU) ................................ 2004904382

(51) Int. Cl.
*A63F 11/00* (2006.01)
*A63F 13/00* (2006.01)

(52) U.S. Cl. ................................ 463/46; 463/1; 463/47

(58) Field of Classification Search .................... 463/46, 463/1, 16–20, 47; 312/198
See application file for complete search history.

(56) References Cited

U.S. PATENT DOCUMENTS

| | | | | |
|---|---|---|---|---|
| 5,995,363 | A | 11/1999 | Wu | |
| 6,498,727 | B2 | 12/2002 | Carr | |
| 7,374,258 | B2 * | 5/2008 | Bowron | 312/7.2 |
| 7,846,026 | B2 * | 12/2010 | Stephenson et al. | 463/46 |
| 7,892,098 | B2 * | 2/2011 | Nguyen et al. | 463/46 |
| 2003/0126139 | A1 * | 7/2003 | Lee et al. | 707/100 |
| 2005/0215325 | A1 * | 9/2005 | Nguyen et al. | 463/46 |

FOREIGN PATENT DOCUMENTS

| | | | |
|---|---|---|---|
| EP | 0316175 | A | 11/1988 |
| GB | 2251329 | A | 7/1992 |
| GB | 2265745 | A | 10/1993 |
| GB | 2300062 | A | 10/1996 |
| WO | 0134259 | A | 5/2001 |

OTHER PUBLICATIONS

International Search Report, Application No. PCT/AU2005/001166, Australian Patent Office, Oct. 6, 2005.

* cited by examiner

*Primary Examiner* — Dmitry Suhol
*Assistant Examiner* — David Duffy
(74) *Attorney, Agent, or Firm* — McAndrews, Held & Malloy, Ltd.

(57) ABSTRACT

A gaming machine (10) is provided having a plurality of modules. The gaming machine (10) may be used to provide a flexible architecture gaming machine. The plurality of modules include a play module (12) containing a display device (14) and a computational device (100) for controlling the operation of the gaming machine (10), and a base module (24) shaped and dimensioned to either directly or indirectly support the play module (1 2). The play module (12) includes a communication interface device (104) operable to communicate with a transaction handler that may be a transaction handling module (16). Also described and claimed is a method of supplying and a method of manufacturing a flexible architecture gaming machine.

22 Claims, 7 Drawing Sheets

GAMING MACHINE AND A METHOD OF SUPPLYING A FLEXIBLE ARCHITECTURE GAMING MACHINE

FIELD OF THE INVENTION

The present invention relates to a gaming machine and a method of supply of a gaming machine. More particularly, the invention relates to flexible architecture gaming machines.

BACKGROUND TO THE INVENTION

The field of gaming machine supply is becoming increasingly competitive. Moreover, it is becoming increasingly necessary to tailor gaming machine structures to accommodate the requirements of individual venues. However, tailoring gaming machine structures to individual venues often results in an increased cost of manufacture. To address the issue of gaming machine costs, it is necessary to manufacture the gaming machines from as low cost components as possible while still satisfying quality and regulatory requirements.

In addition, it would be desirable to be able to satisfy venue operators' requirements while still maintaining the desired functionality and appearance of the gaming machines. It would also be advantageous to be able to supply gaming machines in the most efficient and rapid manner as possible to satisfy the needs of venue operators.

International patent publication number WO 01/34259 A1 describes the provision of a gaming machine that includes a top drawer mounted on rails in an upper part of the gaming machine. The drawer carries a player marketing module and optionally a player tracking module for the gaming machine. A frame is fixed to the front of the drawer which carries keypad buttons and a slot for a card reader. The provision of a drawer is said to have the benefits of improved access to the player marketing module and other equipment and enabling more equipment to be provided in the space available at the top of the gaming machine.

UK Patent Application publication number GB 2300062 A describes an entertainment machine that is made in a modular form and has a removable display panel that can be replaced with a different display panel to enable the game to be changed without requiring replacement of the entire machine.

It is an object of the present invention to provide a flexible architecture gaming machine and a method of manufacture and supply that addresses at least one of the aforementioned needs or desires, or at least to provide the public with a useful alternative.

Any reference in this specification to the prior art is not intended to be and should not be considered an admission that such prior art is well known, or forms part of the common general knowledge, in any country.

Throughout the specification the term "comprise" and variations on this term including "comprising" and "comprises" are to be understood to imply the inclusion of a feature, integer, step or element, and not to exclude other features, integers, steps or elements.

SUMMARY OF THE INVENTION

According to a first aspect of the present invention, there is provided a gaming machine comprising a plurality of modules, the plurality of modules comprising a play module containing, within a first housing, a display, a computational device for controlling the operation of the gaming machine, including utilising the display to display images of at least one game and receiving commands relating to game play from a player through a player interface, and a communication interface operable to communicate with a transaction handler and a base module shaped and dimensioned to either directly or indirectly support the play module.

Preferably, the display includes at least one touch panel and the player interface comprises said at least one touch panel.

Preferably, the gaming machine further comprises a player interface module that provides at least part of the player interface and containing, within a second housing that is distinct from the first housing, one or more player interface devices that the player can manipulate during play of a game on the gaming machine, the second housing removably attachable to at least one of the play module and the base module.

Preferably, the gaming machine further comprises a transaction module that contains the transaction handler and which is in communication with the play module, the transaction module, under the control of the play module attending to the payment and receipt of funds or credits to and from the player respectively. The transaction module may be contained within a transaction module housing that is distinct from the first housing. The transaction module housing may also be removably mountable to the base module.

Preferably, the play module may be removably mounted to the transaction module so that the gaming machine is configured as an upright gaming machine, whereby the base module indirectly supports the play module by supporting the transaction module.

Preferably, the base module may be shaped and dimensioned to support the play module on an upper surface and wherein the transaction module is positioned below the upper surface, whereby the gaming machine is configured as a slant top gaming machine.

Preferably, the transaction handling device is located in a housing that is one of integrally formed with and secured to the base module.

Preferably, the gaming machine further comprises a top box module having a housing that is removably mountable on the play module.

Preferably, the gaming machine further comprises trim removably mountable to the play module.

Preferably, the base module provides part of a power and/or data interface between the play module and one or more other modules.

Preferably, the play module comprises at least one network interface to facilitate data communication between the play module and at least one computer network.

Preferably, the play module comprises a power supply, wherein all power for the gaming machine is distributed through the power supply.

According to a second aspect of the present invention there is provided a method of supplying a flexible architecture gaming machine, the method comprising providing a selection of a plurality of modules that can be assembled to form a gaming machine, each module having a distinct housing, wherein at least one of the plurality of modules comprises a play module containing, within a first housing, a display device and a computational device for controlling the operation of the gaming machine, including utilising the display device to display images of at least one game and receiving commands relating to game play from a player through a player interface, the play module further including a communication device to communicate with a transaction module that is operable to attend to the payment and receipt of funds or credits to and from the player respectively, the play module not including within the housing devices operable to perform the function of said transaction module and supplying a selection of modules from the plurality of modules sufficient to form a gaming machine.

Preferably, the step of providing a selection of a plurality of modules comprises providing a play module and at least one of a transaction module and a base module, wherein the selection of a plurality of modules comprises multiple versions of at least one of the transaction module and the base module, and wherein a version is a module having a different appearance from other like modules.

Preferably, the step of providing a selection of a plurality of modules comprises providing a play module, a transaction module and a base module, wherein the selection of a plurality of modules comprises multiple versions of both the transaction module and the base module, wherein a version is a module having a different appearance from other like modules.

Preferably, the base module has at least two versions, one version shaped so as to form an upright configuration gaming machine and another version shaped so as to form a slant top configuration gaming machine.

Preferably, the transaction module and the base module each have at least two versions, one version shaped so as to form an upright configuration gaming machine and another version shaped so as to form a slant top configuration gaming machine.

Preferably, the step of providing a selection of a plurality of modules comprises providing multiple versions of a top box module, each version having a different appearance.

Preferably, the step of providing a selection of a plurality of modules comprises providing multiple versions of a trim for the play module, each version having a different appearance.

Preferably, the step of providing a selection of a plurality of modules comprises providing a server and an associated database in communication with a computer network, the database containing images of the selection of a plurality of modules one or both of individually and in at least one combination that forms a gaming machine and allowing a purchaser to select combinations of modules after viewing images from the database.

According to a third aspect of the present invention there is provided a method of manufacturing a gaming machine, the method comprising one of constructing and receiving a play module containing, within a first housing, a display device and a computational device for controlling the operation of the gaming machine, including utilising the display device to display images of at least one game and receiving commands relating to game play from a player through a player interface, the play module including a communication interface for communication with a distinct transaction device that, under the control of the play module, is operable to attend to the payment and receipt of funds or credits to and from a player respectively, one of constructing and receiving at least one of a base module for directly or indirectly supporting the play module in a required position and a transaction module including said transaction device, and assembling the gaming machine by physically and/or communicatively connecting the play module and the at least one of a base module and transaction module.

Preferably, the method may further comprise one of constructing and receiving a base module, wherein the step of assembling the game machine comprises removably physically connecting the play module and the base module.

Preferably, the method may further comprise one of constructing and receiving a transaction module, wherein the step of assembling the game machine comprises removably physically connecting the play module and the transaction module.

The method may still further comprise one of constructing and receiving a base module, wherein the step of assembling the game machine comprises forming an upright configuration gaming machine by removably physically connecting the transaction module on top of the base module and removably physically connecting the play module on top of the transaction module.

Preferably, the method further comprises one of constructing and receiving a top box, wherein the step of assembling the gaming machine comprises physically removably connecting the top box to the play module.

Preferably, the method further comprises one of constructing and receiving a trim, wherein the step of assembling the game machine comprises physically removably connecting the trim to the play module.

Further aspects of the present invention will become apparent from the following description, given by way of example only and with reference to the accompanying drawings.

MODES FOR PERFORMING THE INVENTION

Figure 1:
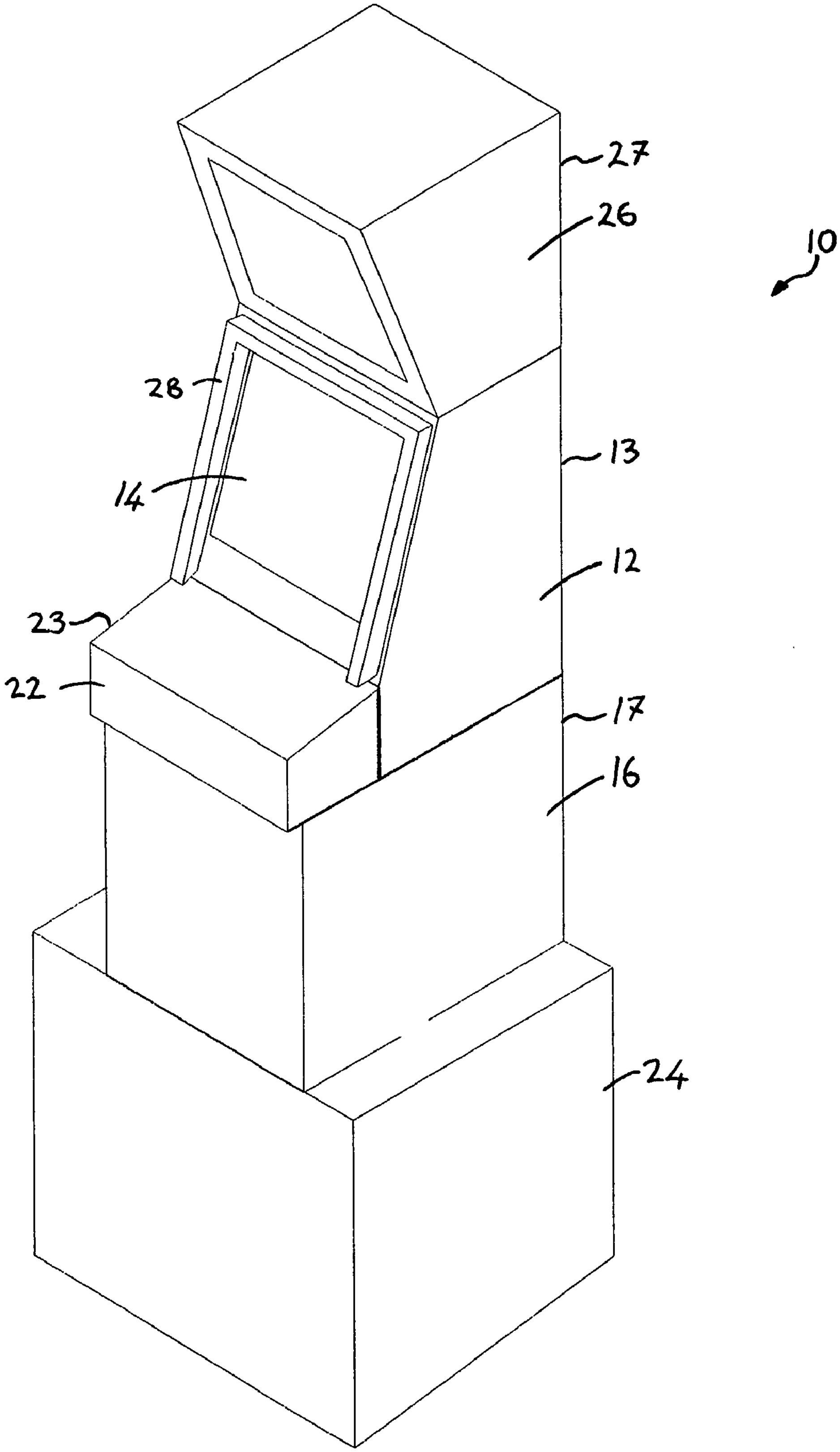
FIG. 1: shows a three dimensional diagrammatic view of a flexible architecture gaming machine, in accordance with a first embodiment of the invention.

Throughout the following description, unless specifically stated otherwise, like reference numerals refer to like components.

Figure 2:
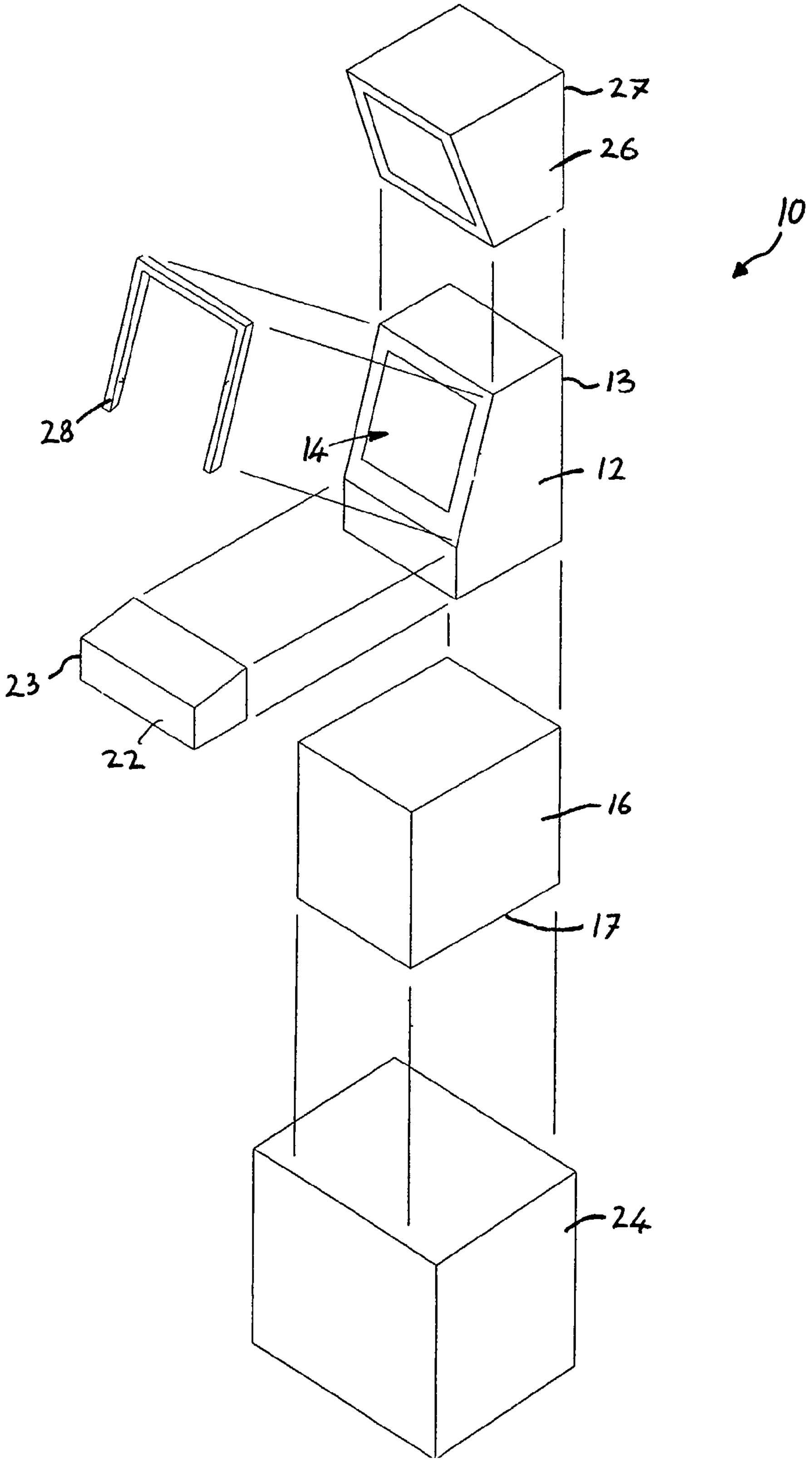
FIG. 2: shows a three dimensional, exploded view of the gaming machine of FIG. 1.

Referring to FIGS. 1 and 2 of the accompanying drawings, a first embodiment of a flexible architecture gaming machine in accordance with an embodiment of the invention is generally referenced by arrow 10. The gaming machine 10 comprises a play module 12, which carries a display device 14 in a housing 13. By way of example only, the display device 14 may be a video display unit, a flat screen display, a mechanical display device, for example mechanical reels, or any other suitable device for displaying images to a player of the gaming machine 10.

The gaming machine 10 includes a transaction handling module 16. The transaction handling module 16 contains wager related input devices, or sub-modules, for example a coin slot, a bank note acceptor, a card reader or similar, housed within a housing 17. The input devices or sub-modules are not shown in FIGS. 1 and 2. The transaction handling module 16 may also contain a coin hopper for paying out wins to a player of the gaming machine 10. The transaction handling module 16 may also contain a printer (not shown) for printing out a ticket through a slot.

A further module of the gaming machine 10 is a player interface module 22 with an associated housing 23. In the embodiment shown in FIG. 1, the player interface module 22 is a midtrim of the gaming machine 10. The player interface module 22 could include any one or more of a key pad, a joystick and any other user interface device suitable for use with a game that the play module 12 can implement. Those skilled in the relevant arts will appreciate that where the display device 14 has a touch-responsive screen, the player interface module 22 may include less interface devices or may be omitted entirely from the gaming machine 10.

The gaming machine 10 may include a mount or base module 24, on which the other modules of the gaming machine 10 are mounted. The mount or base module 24 may be merely a frame or housing, not containing any active components that contribute to the functionality of the gaming machine 10, although this is not essential. In an alternative embodiment, the base module 24 may be omitted. In this alternative embodiment the shape and dimensions of the housing 17 of the transaction handling module 16 is varied to position the play module 12 appropriately.

The gaming machine 10 may further include a top box 26, including a housing 27. The top box 26 could be one of a number of various configurations, including for example, a casino top box, a "low-boy", a round top or other configuration and may or may not include a display.

A modular trim 28 may attach to the housing 13 of the play module 12. The modular trim 28 is replaceable, allowing the appearance of the gaming machine to be readily modified. By replacing the trim 28 and/or other components or modules of the gaming machine 10, the appearance of the gaming machine 10 can be changed subtly or dramatically as required. Accordingly, the gaming machine 10 can be maintained to have an up-to-date appearance. To facilitate updating of the machines and to facilitate other activities like maintenance and replacement of components, the modules of the gaming machine 10 (and other embodiments of a gaming machine in accordance with the present invention) are mechanically connecting using a secure but "quick acting" type connector. Various connectors and methods of connection may be used, including shaping the housings of the modules so that they interlock, providing latches or using traditional fixing means such as nuts and bolts.

The gaming machine 10 shown in FIG. 1 is in the configuration of an upright gaming machine. The modular nature of the gaming machine 10 allows the play module 12 to be used as part of gaming machines having various other configurations. For example, as shown in FIGS. 3 and 4 of the accompanying drawings, a second gaming machine 10*a*, which is in a slant top configuration, may be constructed using the play module 12.

Figure 3:
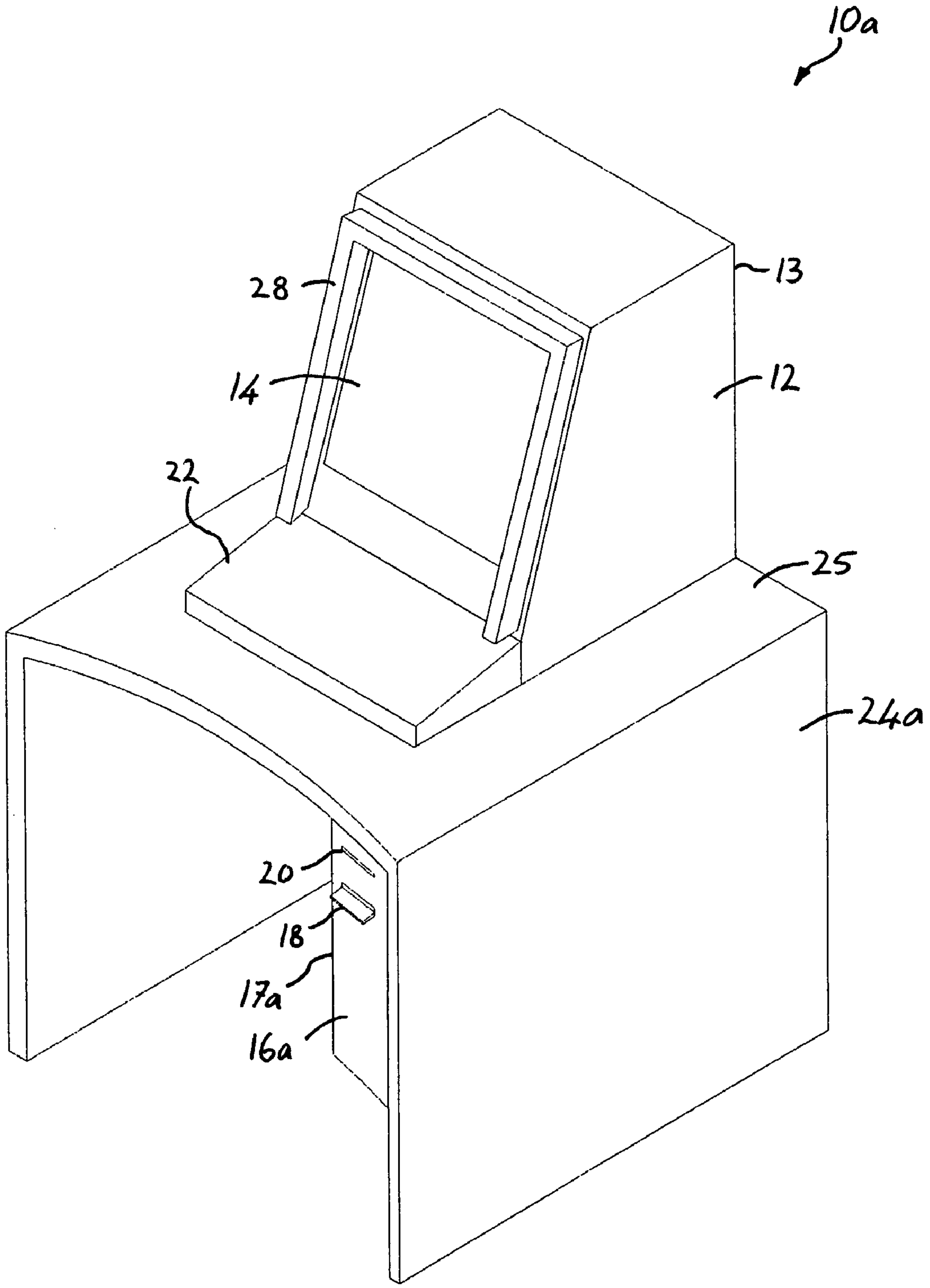
FIG. 3: shows a three dimensional diagrammatic view of a flexible architecture gaming machine in accordance with a second embodiment of the invention.
Figure 4:
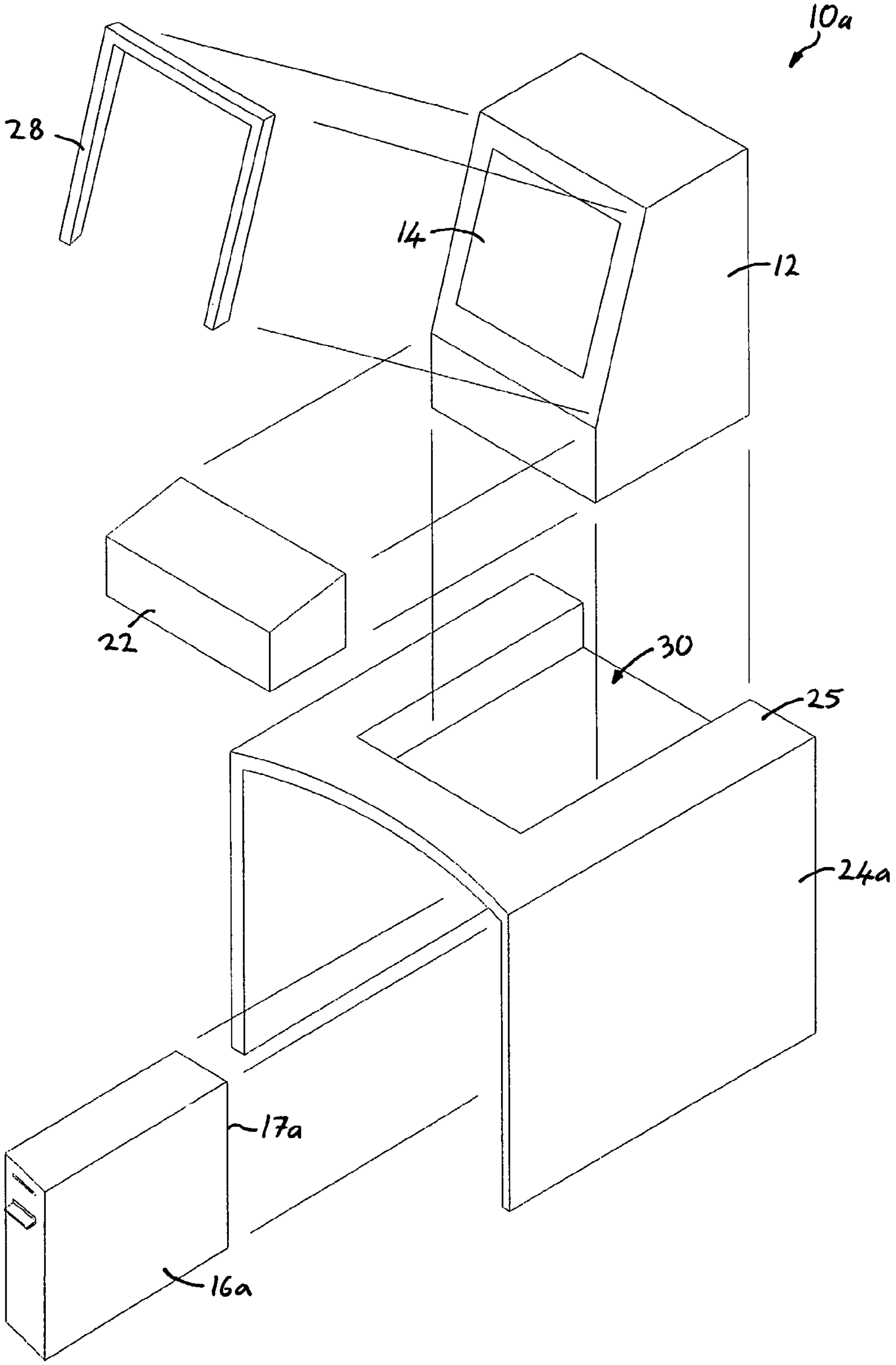
FIG. 4: shows a three dimensional, exploded view of the gaming machine of FIG. 3.

The transaction handling module 16*a* in the embodiment shown in FIGS. 3 and 4 has a housing 17*a* of a similar shape to a tower computer case for a desktop computer. The transaction handling module 16*a* is shown with a bill acceptor 18 and a slot 20 out of which tickets may be ejected after being printed by a printer (not shown) located within the housing 17*a*. Like for transaction handling module 16, alternative or further devices may be provided on the transaction handling module 16*a* to facilitate transactions, depending on the requirements for the gaming machine 10*a*.

The gaming machine 10*a* may advantageously have the same modular trim 28 as the gaming machine 10, although this is not essential and a different modular trim 28 may be used if required.

As shown in FIGS. 3 and 4, the mount or base module 24*a* for the slant-top configuration gaming machine 10*a* could be in the shape of a desk, allowing a player to sit down on a chair in front of the display device 14. The base module 24*a* directly supports the play module 12 on its upper surface 25, which may include a recess 30 to removably receive the play module 12. The recess 30, or alternatively a separate recess or other receptacle, may also receive the player interface module 22. Advantageously, the player interface module 22 is the same for gaming machines 10 and 10*a*, although this is not essential.

The play module 12 and the player interface module 22 can therefore be removed from the recess 30, allowing access to the interior of the play module 12 to enable maintenance and/or upgrading of the gaming machine 10*a*. Alternatively, the play module 12 may be designed and configured so that maintenance and/or upgrading can be effected without the need to remove the play module 12 and/or the player interface module 22 from the recess 30, for example through a door (not shown) provided in the rear or a side of the play module 12.

Figure 5:
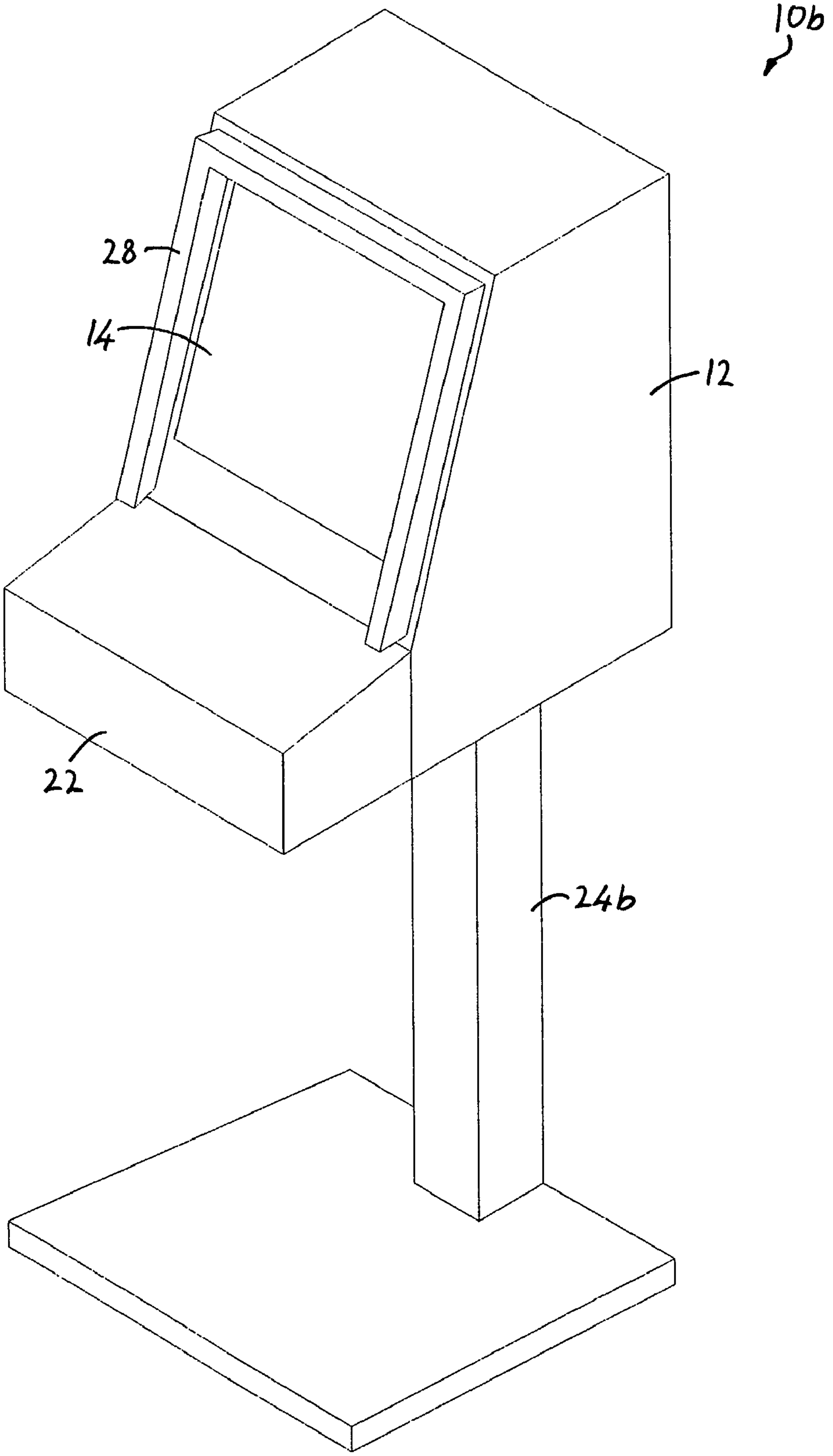
FIG. 5: shows a three dimensional diagrammatic view of a flexible architecture gaming machine, in accordance with a third embodiment of the invention.

FIG. 5 shows a further embodiment of the present invention. The gaming machine 10*b* includes the play module 12, player interface module 22 and modular trim 28 in the same configuration as the gaming machine 10 shown in FIG. 1. The mount or base module 24*b* is in the form of a pedestal-like arrangement on which the play module 12 is mounted. The gaming machine 10*b* is of a "dumb-terminal" type, which is connectable to a remotely arranged transaction handling device (not shown). The play module 12 may communicate with the remote transaction handling device through a hard wired or wireless manner. In a preferred embodiment, the same communication interface is used whether the transaction device is local to or remote from the play module 12.

Figure 6:
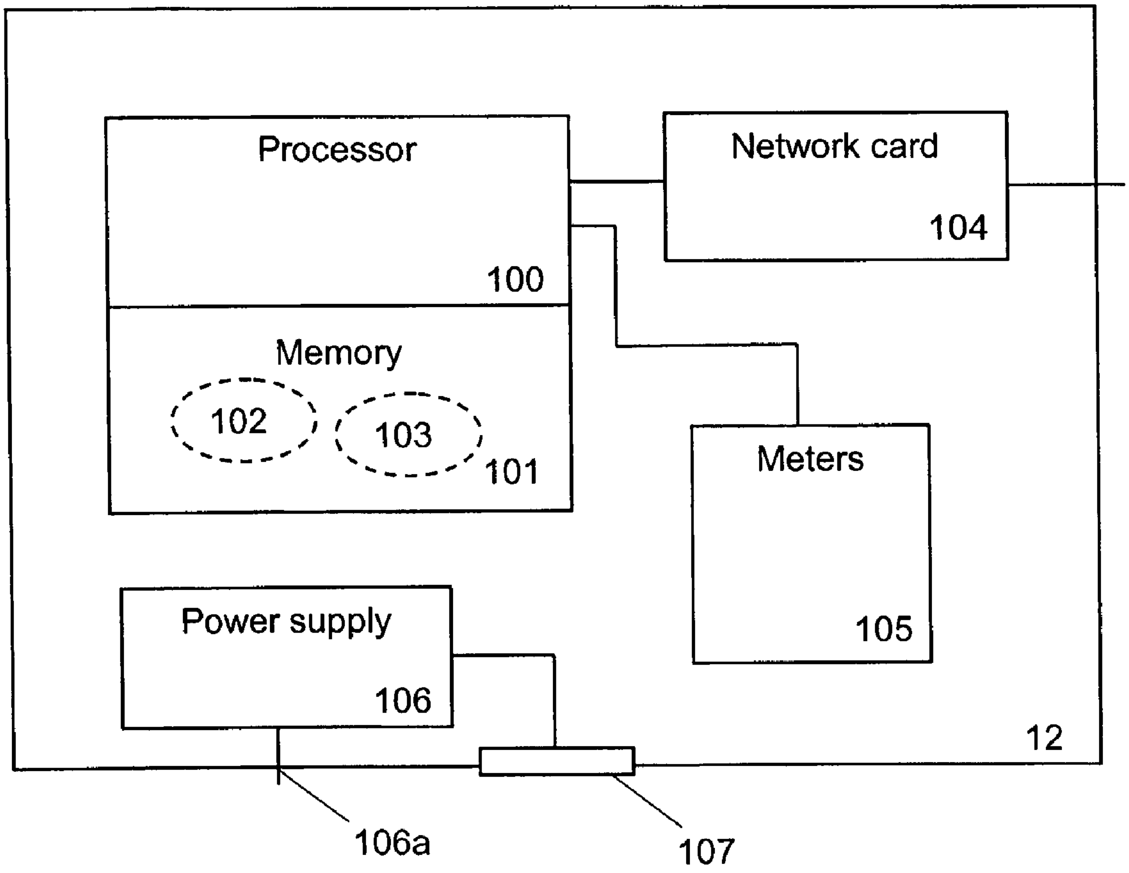
FIG. 6: shows a block diagram showing one embodiment of the internal structure of a play module according to an aspect of the present invention.

Referring to FIG. 6, a block diagram of the play module 12 is shown. The play module contains a processor 100 and an associated computer memory 101 in which is stored an operating system 102. The processor 100 may be any suitable computational device, for example a microcontroller or microprocessor. The processor 100 also executes game software 103. Those skilled in the relevant arts will appreciate that neither the processor 100 nor the memory 101 need comprise a single device and that the play module 12 may contain and utilise multiple computational devices and computer memory elements to perform its functions.

Where the gaming machine 10 is to be linked to a network, for example through a local or wide area network to a game machine controller or other device, such as a jackpot controller for a group of game machines including game machine 10, then the play module 12 includes one or more appropriate network cards. A single network card 104 is shown in FIG. 6. As may be required by regulatory authorities, the play module 12 also includes gaming machine meters 105.

The play module 12 further includes a power supply 106 for the gaming machine 10. The power supply 106 receives power from a source, typically the mains, through a suitable connection 106*a* and may be connected to one or more sockets 107 that connect to a complementary plug on another module, for example the transaction handling module 16 or the base module 24*a* to allow the play module 12 to transfer power to one or more of the other modules comprising the gaming machine 10, through a lead or other connector if required. Those skilled in the relevant arts will appreciate that the plug and socket arrangement described herein represents only one possible way of transferring power between the modules, with other examples including using contacting conductive plates located appropriately on the exterior of the housing of the play module 12 and the other modules, using a combined power and data transfer cable and using inductive power transfer. The electrical connectors may be individual per module or grouped into a "trunk loom" with "plug-in" capability.

To further increase the flexibility of configurations available, the play module, player interface module, transaction handling module and base module could be provided in various versions. Preferably, all versions of each module can connect to each other, although if some versions of modules have an entirely different shaped housing from other modules, then they may be able to physically connect to a subset of the available other modules. The base module may be used to advantage to facilitate different physical configurations of gaming machine, while still allowing power and data communications between the modules as required. In some configurations, the base module may include one or more power and/or data carriers connecting the other modules. Alternatively intermediate connectors separate from the base module may be provided between the modules, the connectors having any required housing or shielding to prevent damage to the power or data carriers and to prevent access to the power or data carriers by the player. Therefore, a venue may select different versions of the modules to create a gaming machine that can be assembled for that venue that is one of a large number of possible shapes and appearances. This may be augmented by variations that may be available in the trim 28 that is applied to the play module 12.

Furthermore, any or all of the play module 12, transaction handling module 16, player interface module 22 and the top box 26 may comprise a plurality of sub-modules. In this manner each module of a gaming machine constructed in accordance with the present invention may be customised for a particular venue operator so as to include differing functions. Taking the example of the transaction handling module 16, each of the various devices that enable the transaction of funds or credits may be modular in nature, with the system usefully configured as a "plug and play" system to facilitate ready exchange of modules.

Figure 7:
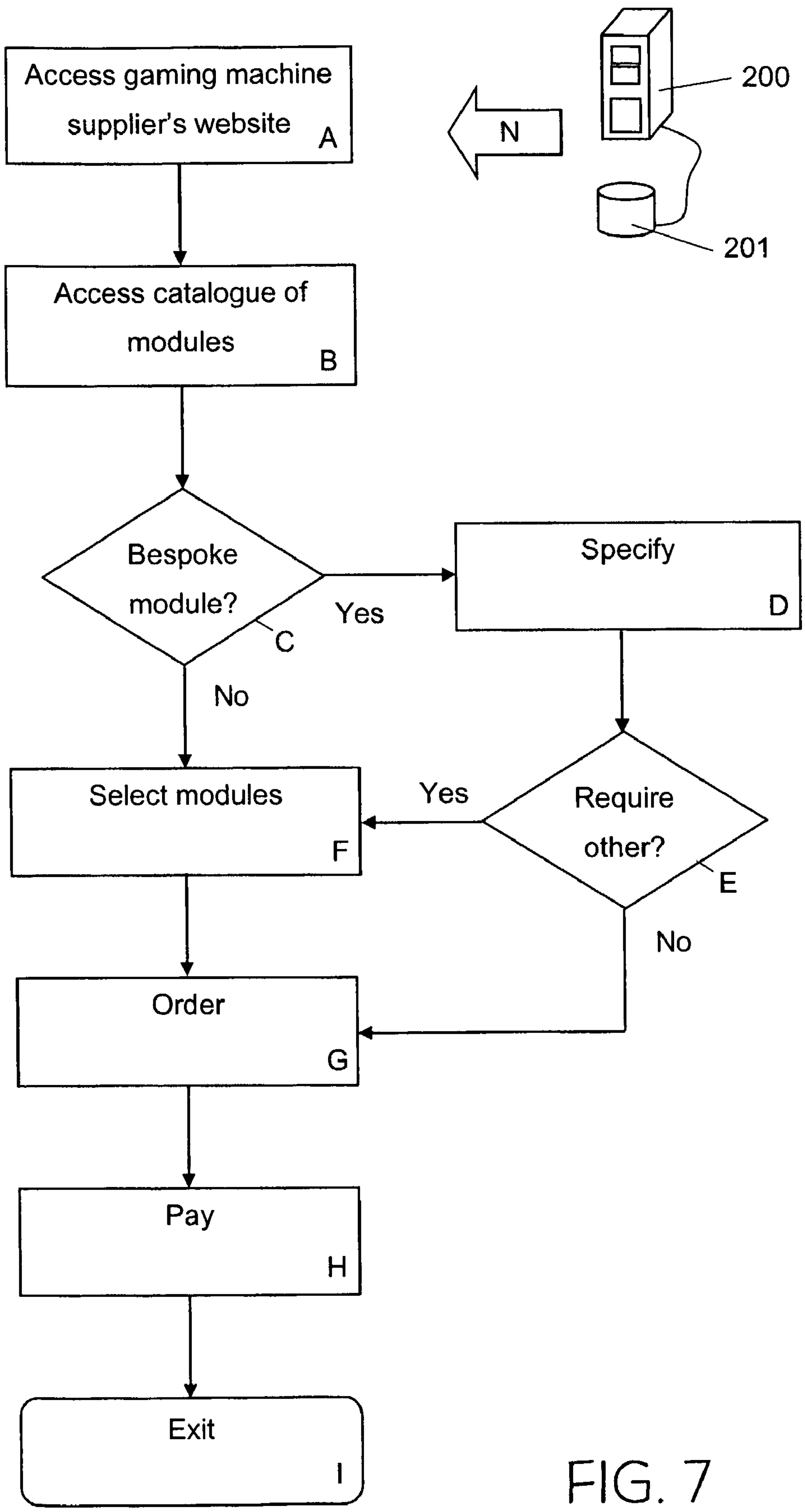
FIG. 7: shows a flow chart of a method of supplying gaming machines in accordance with a further aspect of the invention.

It is envisaged that, in the supply of flexible architecture gaming machines in accordance with the present invention, the supplier of the gaming machines could maintain a minimum inventory store, by storing a required amount of the modules that can be configured to form gaming machines of different configurations rather than having to store an inventory of complete gaming machines in all the different configurations that may be requested. A venue desiring to purchase or lease a gaming machine would order the appropriate modules, as required, from the gaming machine supplier. Conveniently this may be completed by an on-line ordering process, optionally including e-commerce payment functionality. A flow diagram of a one possible series of steps for a venue operator to make an order is shown in FIG. 7.

To enable on-line ordering, a web server 200 may access a database 201 that contains a gaming machine supplier's catalogue. As broadly represented by arrow N in FIG. 7, the web server 200 provides information to the venue operator through a computer (not shown) that has access to the internet and is loaded with appropriate browser software. The venue operator could access a website of the gaming machine supplier in order to access a catalogue maintained in the database 201 containing details of the play module 12, transaction handling module 16, player interface module 22 and the top box 26, their various other versions, including options for different sub-modules, and details of the base modules and trims that are available (steps A and B), together with any other components or optional features that may be available. If desired, the venue operator may also be able to specify that they wish to order a bespoke module (step C). Thus, the web ordering page of the website may enable the venue operator to specify the required characteristics of the bespoke modules to be ordered (step D). After the venue operator has specified the bespoke modules, they may be given an option (step E) to select further modules (step F) or proceed directly to an order confirmation page, select an order button or otherwise submit their order (step G). Once the venue operator has selected the modules and placed the order, they then may also pay online (step H) if this functionality is provided, for example, via a checkout facility of the website and exits the website (step I). Upon receipt of the order, the supplier of the gaming machine 10 fills the order.

The web-site may specify the specific combinations of modules that can physically connect to each other and prevent the venue operator from ordering any combinations that will not connect to each other at least without first warning them of this. The web-site may also be able to display, in addition to or instead of displaying each module, possible combinations of modules so that the venue operator can see the appearance of the game that they are ordering by selecting a particular combination of modules. Preferably, the venue operator may be able to select a combination of modules and through the click of a button or other action request a visual representation of a gaming machine incorporating the selected combination of modules is provided. The website server may have access to a database of images of gaming machines constructed from combinations of modules to facilitate this.

Preferably, the supplier of the gaming machine 10 maintains a minimum, if any, inventory of the various modules of the gaming machine 10. Rather, the supplier of the gaming machine 10 orders (or produces themselves) the modules as and when required from the module suppliers. The module suppliers can be selected by the gaming machine supplier as "best-in-class" suppliers who can manufacture the particular modules in the most cost effective manner.

An advantage to the supplier of gaming machines in accordance with the present invention is that, by using external sources to supply the modules, the supplier of gaming machines is dealing with a limited number of components, as opposed to thousands of individual parts. The gaming machine supplier also does not have the inventory handling costs and related infrastructure and has much lower storage requirements.

In addition, the venue operator can alter the gaming machines and achieve variations of the operator's gaming machines by changing modules without changing the entire gaming machine. Thus, more variety is provided.

The modular nature of gaming machines constructed according to the present invention facilitates rapid assembly of the gaming machine, which is important in high cost jurisdictions. In addition, regulatory approval may be easier to obtain as the parts of the gaming machine that require regulatory approval can be isolated, for example, the play module 12 and the transaction handling module 16, rather than the whole machine having to be approved each time it is changed.

Furthermore, the total manufacturing time may be reduced, as production lines can be standardised to produce the modules. This reduction in manufacturing time is achieved while still retaining the ability to produce a large number of different variations of gaming machine.

It will be appreciated by persons skilled in the art that numerous variations and/or modifications may be made to the invention as shown in the specific embodiments without departing from the scope of the invention as defined in the appended claims. The present embodiments are, therefore, to be considered in all respects as illustrative and not restrictive.

The invention claimed is:

1. A gaming machine comprising a plurality of modules, the plurality of modules comprising:

a play module having a first housing containing a display, a computational device for controlling the operation of the gaming machine, including utilising the display to display images for game play of at least one game and receiving commands relating to the game play from a player through a player interface, and a communication interface operable to communicate with a transaction handler;

a player interface module having a second housing including the player interface, wherein the player interface module and play module are configured for horizontal engagement and for electrical connection with one another;

a transaction module having a third housing including the transaction handler, wherein the transaction module and play module are configured for vertical engagement and for electrical connection with one another;

a base module shaped and dimensioned to support the play module and the transaction module; and wherein the base module, first housing, second housing, and third housing are separable from one another as distinct physical units, and wherein the first housing, second housing, third housing, and base module are shaped and dimensioned to define a form factor of the gaming machine.

2. The gaming machine of claim 1, wherein the display includes at least one touch panel that is used to provide player input for game play of the at least one game.

3. The gaming machine of claim 1, wherein the third housing is configured to vertically engage the base module.

4. The gaming machine of claim 3, wherein the third housing includes an upper surface shaped and configured to support the play module and the player interface module.

5. The gaming machine of claim 3, wherein the base module is shaped and dimensioned to support the play module on an upper surface and wherein the transaction module is positioned below the upper surface, whereby the gaming machine has a slant top gaming machine form factor.

6. The gaming machine of claim 1 further comprising a top box module having a fourth housing that is removably mountable vertically above the play module.

7. The gaming machine of claim 1 further comprising trim removably mountable to the play module.

8. The gaming machine of claim 1, wherein the base module provides at least part of a power or data interface between the play module and one or more of the player interface module or transaction module.

9. The gaming machine of claim 1, wherein the play module comprises at least one network interface to facilitate data communication between the play module and at least one computer network.

10. The gaming machine of claim 1, wherein the play module comprises a power supply and wherein all power for the gaming machine is provided by the power supply.

11. A method of supplying a flexible architecture gaming machine, the method comprising:

providing a selection of a plurality of modules that can be assembled to form a gaming machine, each module having a distinct housing, wherein the plurality of modules include a play module having a first housing containing a display device and a computational device for controlling the operation of the gaming machine, including utilising the display device to display images for game play of at least one game and receiving commands relating to the game play from a player through a player interface, the play module further including a communication device to communicate with a transaction handler that is operable to attend to the payment and receipt of funds or credits to and from the player respectively, a player interface module having a second housing including the player interface, wherein the player interface module and play module are configured for horizontal engagement and for electrical connection with one another, a transaction module having a third housing including the transaction handler, wherein the transaction module and play module are configured for vertical engagement and for electrical connection with one another, a base module shaped and dimensioned to support the play module and the transaction module, wherein the first housing, second housing, third housing, and base module are shaped and dimensioned to define a form factor of the gaming machine; and supplying the selection of modules from the plurality of modules sufficient to form a gaming machine.

12. The method of claim 11, wherein the plurality of modules comprises multiple versions of at least one of the transaction module and the base module, and wherein a version is a module having a housing with a different appearance from other like modules.

13. The method of claim 12, wherein the base module has at least two versions, one version shaped so as to form an upright configuration gaming machine and another version shaped so as to form a slant top configuration gaming machine.

14. The method of claim 11, wherein the plurality of modules comprises multiple versions of both the transaction module and the base module, wherein a version is a module having a different appearance from other like modules.

15. The method of claim 14, wherein the transaction module and the base module each have at least two versions, one version shaped so as to form an upright configuration gaming machine and another version shaped so as to form a slant top configuration gaming machine.

16. The method of claim 11, wherein the providing a selection of a plurality of modules comprises providing multiple versions of a top box module, each version having a different appearance.

17. The method of claim 11, wherein the providing a selection of a plurality of modules comprises providing multiple versions of a trim for the play module, each version having a different appearance.

18. The method of claim 11, wherein the providing a selection of a plurality of modules comprises providing a server and an associated database in communication with a computer network, the database containing images of the selection of a plurality of modules one or both of individually and in at least one combination that forms a gaming machine and allowing a purchaser to select combinations of modules after viewing images from the database.

19. A method of manufacturing a gaming machine, the method comprising:

receiving a play module having a first housing containing a display device and a computational device for controlling the operation of the gaming machine, including utilising the display device to display images for game play of at least one game and receiving commands relating to game play from a player through a player interface, the play module including a communication interface for communication with a distinct transaction device that, under the control of the play module, is operable to attend to the payment and receipt of funds or credits to and from a player respectively;

receiving a player interface module having a second housing including the player interface, wherein the player interface module and play module are configured for horizontal engagement and for electrical connection with one another;

receiving a transaction module having a third housing including the transaction handler, wherein the transaction module and play module are configured for vertical engagement and for electrical connection with one another;

receiving a base module shaped and dimensioned to support the play module and the transaction module; and assembling the gaming machine by physically and communicatively connecting the play module, the transaction module, the player interface module, and the base module in a manner to form a complete gaming machine, wherein the play module, first housing, second housing, and third housing are separable from one another as distinct physical units, and wherein the first housing, second housing, third housing, and base module are shaped and dimensioned to define a form factor of the gaming machine.

20. The method of claim 19, wherein the assembling the game machine comprises forming an upright configuration gaming machine form factor by removably physically connecting the transaction module on top of the base module and removably physically connecting the play module on top of the transaction module.

21. The method of claim 19, further comprising receiving a top box, wherein the assembling the gaming machine comprises physically removably connecting the top box to the play module.

22. The method of claim 19, further comprising receiving a trim, wherein the assembling the game machine comprises physically removably connecting the trim to the play module.

* * * * *